United States Patent [19]

Goll et al.

[11] Patent Number: 5,023,445

[45] Date of Patent: Jun. 11, 1991

[54] SIGNAL ACQUISITION METHOD AND AUTOMATIC MASKING SYSTEM FOR AN OTDR

[75] Inventors: Jeffrey H. Goll, Lake Oswego; William A. Trent, Bend; Richard I. Lane, Bend; Florian G. Bell, Bend; Mark D. Marineau, Redmond, all of Oreg.

[73] Assignee: Tektronix, Inc., Beaverton, Oreg.

[21] Appl. No.: 515,792

[22] Filed: Apr. 27, 1990

[51] Int. Cl.⁵ .............................................. H01J 5/16
[52] U.S. Cl. ................................. 250/227.15; 356/73.1
[58] Field of Search ....................... 250/227.15, 227.16, 250/227.21; 356/73.1

[56] References Cited

U.S. PATENT DOCUMENTS 4,450,434  5/1984  Nielsen et al. .................. 250/227.15
4,934,819  6/1990  Coppa et al. ....................... 356/73.1
4,960,989  10/1990  Liebenrood et al. ........... 250/227.15

Primary Examiner—David C. Nelms
Assistant Examiner—Que Tan Le
Attorney, Agent, or Firm—William K. Bucher

[57] ABSTRACT

An automatic masking system is used in an optical time domain reflectometer for implementing a method of compensating for relaxation transients in an optical receiver in the OTDR. The masking system drives an optical modulator that masks the optical reciver from high amplitude optical pulses in the return reflected light from a fiber under test. A masking pattern corresponding to the high amplitude optical pulses is generated from a first acquisition of data with the receiver unmasked from the return reflected light. The masking pattern is stored and used for generating a signal from the masking system to the optical modulator for blocking the high amplitude optical pulses in the return reflected light during a subsequent acquisition of data. In a third acquisition of data of the return reflected light, the optical modulator masks the receiver from the return reflected light. Combining the acquired data of the blocked return reflected light with the acquired data with the high amplitude optical pulses blocked, produces an output free of relaxation transients produced by the receiver. Combining the high amplitude optical pulse data from the first acquisition with the output from the subtracted acquisitions produces an output representative of the return reflected light.

15 Claims, 10 Drawing Sheets

SIGNAL ACQUISITION METHOD AND AUTOMATIC MASKING SYSTEM FOR AN OTDR

BACKGROUND OF THE INVENTION

The present invention relates to the acquisition and conversion of optical signals to electrical signals and more particularly to a method of compensating for relaxation transients in an optical receiver using an optical modulator automatic masking system.

Optical time domain reflectometers, OTDR, are used for testing optical transmission lines, such as fiber optic cables and the like, for attenuation, discontinuities, and faults, which affect the quality of optical signals transmitted through the fiber. In testing an optical fiber with an OTDR, the fiber under test is connected to a front panel connector and optical pulses from a laser are launched into the fiber. During the interval between the pulses, backscattered light from the fiber produced by the Rayleigh effect and light produced by discrete reflection sites are directed to a photosensitive detector, such as an avalanche photodiode or the like. The detector converts the backscattered light signal into an electrical signal, which is amplified, sampled and displayed on an output device. Discontinuities associated with cable splices and the like may produce return reflections that are orders of magnitude greater than the backscatter signal level. The large reflected signals overdrive the optical receiver producing an output electrical pulse that has a slowly decaying trailing edge. This receiver transient tail may be caused by carrier diffusion or trapping effects in the photodetector. Amplifier transient responses may also exhibit slowly decaying transients.

To view events in the fiber that would be hidden or distorted by the receiver transient tail, OTDR instrument makers have used optical modulators in the return optical signal path to mask the high amplitude reflections returning from the fiber under test. Data samples of the return reflected light from the fiber are acquired, processed, and displayed. An operator identifies the locations of the high amplitude reflections and manually sets mask locations corresponding to the reflections. With the mask locations set, the fiber is re-examined. The optical modulator blocks the return optical signal from the fiber at the mask locations identified by the operator. The masking function is triggered either by a counter/digital comparator system or an analog ramp/comparator during the cable re-examination. One drawback to such systems is that the number of mask points is limited by the amount of hardware required to implement the system. In addition, the mask points have to be set manually by the operator and then the cable has to be re-examined.

U.S. Pat. No. 4,769,534 to Brand and assigned to the assignee of the present invention describes a method of reducing optical detector storage time effects by using an optical modulator to mask the return reflected signal prior to sampling the output of the receiver. The modulator is turned on just before or concurrent with the beginning of a sample strobe to allow the return reflected signal to impinge on the detector. This prevents a previous large return reflected signal from reaching the optical detector prior to the sample time and creating storage effects that might distort the electrical output signal during the sampling time.

One problem with the use of optical modulators, such as Bragg Cells, in these masking systems is that the modulators have a finite on/off ratio. This means that a certain amount of light passes through the cell during the time the device is masking the optical signal. Depending on the on/off ratio of the device, imperfect masking may result in a reduction but not an elimination of the distortion due to receiver transients. What is needed is a method for increasing the effectiveness of the masking performed with optical modulators having limited on/off ratios. Additionally, an automatic masking process is needed to replace the manual masking process.

SUMMARY OF THE INVENTION

Accordingly the present invention is a method of compensating for relaxation transients in a high dynamic range optical receiver such as that used in an optical time domain reflectometer, OTDR. The optical receiver in the OTDR converts the optical signal input in the form of return reflected light from a fiber under test to an electrical signal level representative of the optical signal level input. High amplitude optical pulses in the return reflected light are converted to electrical pulses that have receiver transient tails on their trailing edges produced by the relaxation transients in the optical receiver. The compensation method consists of combining the results of two data acquisitions. In the first acquisition, an optical modulator, such as a Bragg Cell, masks the optical receiver from the high amplitude optical pulses in the return reflected light while allowing return reflected light from regions free of the large amplitude pulses to reach the receiver unattenuated. The result is a first electrical output from the receiver having the electrical pulses and the receiver transient tails attenuated and the signal level representative of the optical signal level unattenuated. Another acquisition of data is made of the return reflected light with the optical receiver masked from all return reflected light to produce a second electrical signal output from the receiver having the signal level representative of the optical signal level input, the electrical pulses, and the transient tails all attenuated. The second electrical output is combined with the first electrical output to produce a resultant electrical output that is representative of the signal level of the return reflected light. To produce an electrical output representative of the return reflected light including the high amplitude optical pulses, the electrical pulses from an original examination of the fiber without masking is combined with the resultant electrical output.

In implementing the compensation method for relaxation transients in an OTDR optical receiver, an automatic masking system is used. The automatic masking system has means for generating a masking pattern from the output of the optical receiver corresponding to the high amplitude optical pulses in the return reflected light. The masking pattern is used to control an optical modulator that shields the optical receiver from the high amplitude optical pulses in the return reflected light. The optical modulator also receives signals from the automatic masking system for either continuous shielding of the optical receiver from the return reflected light from the fiber or continuous unshielding of the receiver.

To generate an OTDR display representative of the return reflected light from a fiber under test, a first electrical output from the optical receiver is produced that is not masked by the optical modulator. The automatic masking system generates the masking pattern corresponding to the high amplitude optical pulses from the fiber. A second output is produced from the optical receiver with the optical modulator masking the high amplitude optical pulses in response to the masking pattern received from the automatic masking system. A third output is from the optical receiver is produced with the optical modulator masking all the return reflected light from the fiber under test. The second and third outputs are combined to produce a resultant representative of the signal level of the return reflected light. The high amplitude pulses from the first produced output are combined with the resultant output to produce an output representative of the return reflected light from the fiber under test.

The objects, advantages and novel features of the present invention are apparent from the following detailed description when read in conjunction with the appended claims and attached drawings.

DETAILED DESCRIPTION OF THE PREFERRED EMBODIMENT

The present invention is implemented in an optical time domain reflectometer, OTDR, for use in testing fiber optic cables. Optical pulses are launched into the optical fiber from the OTDR and return reflected light from the fiber is converted to an electrical signal by a high dynamic range optical receiver and sampled producing an output representative of the return reflected light from the fiber. Typically, the return reflected light from the fiber under test contains high amplitude optical pulses that are generated in the fiber in response to discontinuities, such as cable splices and the like. The optical receiver converts these high amplitude optical pulses to electrical pulses, which contain slowly decaying tails on their trailing edges caused by relaxation transients in the receiver. The method of compensating for these relaxation transients uses an optical modulator, such as a Bragg Cell, to mask the receiver from the high amplitude optical pulses in the return reflected light. In the following discussion, the data acquired by masking only the large optical pulses is referred to as the data trace and the data acquired with the optical modulator blocking all return reflected light from the fiber under test is referred to as the spurious trace.

Figure 1:
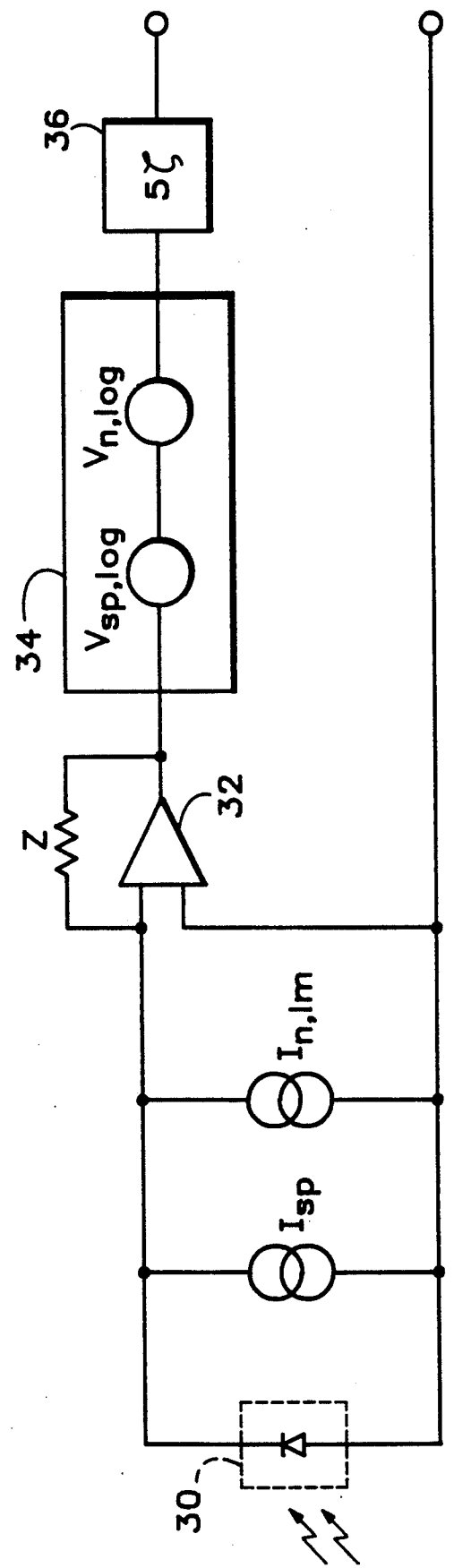
FIG. 1 is an idealized optical receiver for an OTDR implementing the transient response compensation method of the present invention.

The optical receiver in the OTDR may be modeled as a photodetector 30, followed by a transimpedance amplifier 32, a logarithmic amplifier 34, and a scaler 36 to calibrate the resultant output for display as is shown in FIG. 1. In actual implementation, the transimpedance amplifier and the logarithmic amplifier are combined but it is useful for conceptual purposes to separate them.

The optical power falling on the photodetector when a sample of the data trace corresponding to a position x in the fiber is taken is given by $$P_{opt}(x) = P_{BS}(x) + P_{Sp,opt}(x). \quad [1a]$$

$P_{BS}(x)$ is the optical power in Watts backscattered from the fiber location x meters from the OTDR front panel. The term $P_{Sp,opt}(x)$ is included to describe any spurious optical power, in Watts, falling on the detector at the time corresponding to position x. $P_{Sp,opt}(x)$ is expected to be negligible.

The optical power on the ideal photodetector 30 generates a photocurrent $$I_{opt}(x) = R \cdot P_{opt}(x), \quad [1b]$$

where R is the photodetector responsivity in Amps/Watt. The input to the transimpedance amplifier is $$I_{in,total}(x) = I_{opt}(x) + I_{Sp}(x_-) + I_{N1,lin}(x), \quad [1c]$$

Two terms, $I_{N1,lin}(x)$ and $I_{Sp}(x_-)$, have been added to describe noise and spurious response. $I_{N1,lin}(x)$ includes all noise sources, referred to the amplifier input, that precede the log-amp and $I_{Sp}(x_-)$ includes all spurious responses (photodetector and transimpedance amplifier) that precedes the log-amp, again referenced to the amplifier input. The argument $x_-$ is used to emphasize that these spurious currents can arise from events preceding or coincident with the sample taken corresponding to location x. In particular, the dominant expected contributor to $I_{Sp}(x_-)$ is non-ideal receiver impulse response, including detector diffusion tail. Equation 1c implicitly assumes that the contribution of $P_{opt}(x)$ to $I_{in,total}(x)$ depends only on location x and not on locations preceding x. This assumes that the incremental contribution to the data trace from the fiber backscattered intensity of the return reflected light is independent of the spurious response that exists when the relevant sample is taken. This amounts to the assumption that the linear part of the receiver responds linearly to the light input intensity in the range of interest.

The output of the idealized transimpedance amplifier with transimpedance Z is $$V_{lin}(x) = Z \cdot I_{in,total}(x). \quad [1d]$$

Equation 1d represents the input to the log-amp. The output of the log-amp is written a $$V_{log}(x) = log[V_{lin}(x)] + [V_{Sp,Log}(x_-) + V_{N1,Log}(x)]. \quad [1e]s$$

Terms $V_{Sp,Log}(x_-)$ and $V_{N1,Log}$ are added to model spurious response and noise in the log-amp section. Both are added as simple additive voltage sources following the log-amp. This is a simplification, since in the real system it is possible to have spurious response and noise that cannot be modeled simply as linear (before the log-amp) or logarithmic (after the log-amp).

The output of the log-amp is passed through a scaler to give the display data $$V_{data}(x) = S \zeta V_{log}(x), \quad [1f]$$

where $\zeta$ is a scaling factor chosen to make the display read in one-way optical dB. That is, 1 dB on the display corresponds to 1 dB of optical power loss incurred in traveling one way out toward position x on the fiber. This corresponds to a 2 dB change in the optical power falling on the photodetector, and a 4 dB change in the electrical output of the photodetector.

Combining equations 1a-f, $V_{data}(x)$ equals $$V_{data}(x) = 5\zeta\{log[Z[R[P_{BS}(x) + P_{Sp,opt}(x)] + I_{Sp}(x\_) + I_{N1,lin}(x)]] + [V_{Sp,log}(x\_) + V_{N1,log}(x)]\} \quad [2]$$

The receiver spurious response is characterized by a second output of the optical receiver with the optical modulator blocking the return reflected light from the fiber. The ratio of transmission through the optical modulator in one state to the transmission in the other state is denoted by $\alpha$. $\alpha$ will be near zero for a good device and $0 \leq \alpha \leq 1$ in all cases. Remembering the linearity assumption and ignoring the minor differences in $I_{Sp}(x\_)$, the only change in equation 2 is the weighting of the optical response by this factor $\alpha$:

$$V_{spur}(x) = 5\zeta\{log[Z[\alpha R[P_{BS}(x) + P_{Sp,opt}(x)] + I_{Sp}(x\_) + I_{N2,lin}(x)]] + [V_{Sp,log}(x\_) + V_{N2,log}(x)]\} \quad [3]$$

A second key assumption is that the only significant terms in equations 2 and 3 are the optical backscatter and the linear receiver response. Equations 2 and 3 simplify to $$V_{data}(x) = 5\zeta \cdot log[Z[RP_{BS}(x) + I_{Sp}(x\_)]] \quad [4a]$$

and $$V_{spur}(x) = 5\zeta \cdot log[Z[\alpha RP_{BS})x) + I_{Sp}(x\_)]]. \quad [4b]$$

$P_{BS}(x)$ is solved for using equations 4a-b:

$$P_{BS}(x) = \frac{10^{\frac{V_{data}(x)}{5\zeta}} - 10^{\frac{V_{spur}(x)}{5\zeta}}}{RZ(1-\alpha)}. \quad [5]$$

or, in one way optical dB, $$V_{compensated}(x) = 5log\left[\frac{10^{\frac{V_{data}(x)}{5\zeta}} - 10^{\frac{V_{spur}(x)}{5\zeta}}}{RZ(1-\alpha)}\right]. \quad [6]$$

If $V_{sp,log}(x\_)$ contributes to the spurious response, then the left hand sides of Equations 4a-b would have additional terms. If the additional term for the data trace and the term for the spurious trace are identical, then the effect is simply to translate the results in equation 6, which would not affect splice loss or fiber loss measurements. If the two additional terms differ by a constant amount, then the spurious record may be translated by a constant amount $\delta_{dB}$ to compensate for the varying spurious responses in the two electrical outputs from the optical receiver. Equation 6 would then be replaced by:

$$V_{compensated}(x) = 5log\left[\frac{10^{\frac{V_{data}(x)}{5\zeta}} - 10^{\frac{V_{spur}(x)-\delta dB}{5\zeta}}}{RZ(1-\alpha)}\right]. \quad [7]$$

The modeling and analysis of the optical receiver for an OTDR just described results in a method of compensating for receiver transients in the optical receiver. $V_{spur}(x)$ which represents the receiver spurious response is combined with $V_{data}(x)$ which represents the actual data plus the receiver spurious response. In the above analysis, calculations involved raising 10 to appropriate powers and taking logarithms because the log amp 34 was included as part of the optical receiver. In an optical receiver that does not logarithmically amplify the photocurrent from the photodetector 30, these values are directly subtracted from each other.

Figure 2:
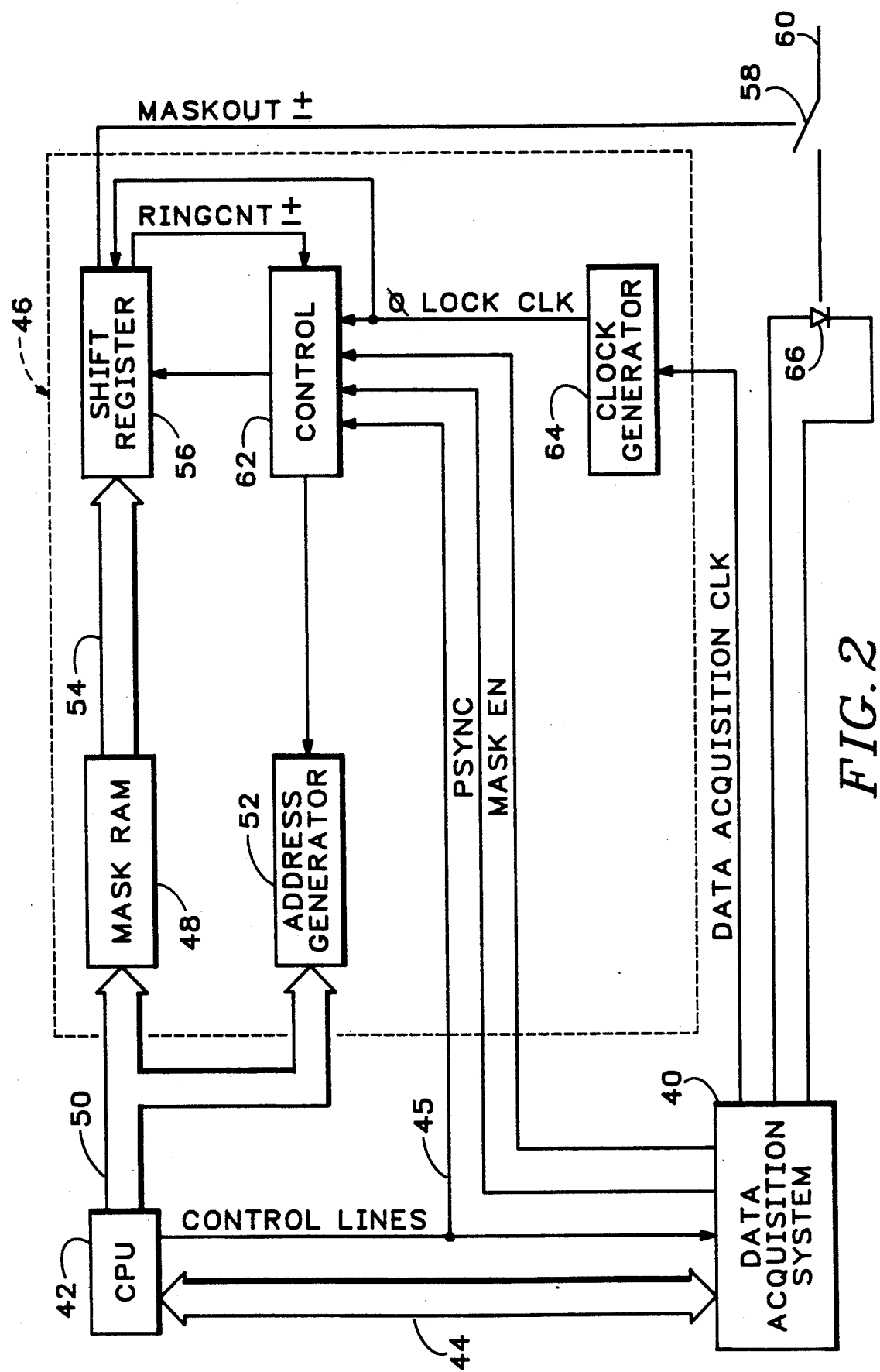
FIG. 2 is a block diagram of an OTDR having an automatic masking system for implementing the transient response compensation method of the present invention.

Referring to FIG. 2, there is shown a microprocessor controlled OTDR system having an automatic masking system for implementing the method for compensation for relaxation transients in the optical receiver of the OTDR. The OTDR has a data acquisition system 40, such as described in co-pending U.S. patent application No. 07/428,534, filed Oct. 30, 1989 by William A. Trent et al entitled "Address Generator for High Speed Data Averager" and application No. 07/399,663, filed Aug. 8, 1989 by William A. Trent entitled "Digital Time Base with Differential Period Delay," for acquiring data under microprocessor control representative of the return reflected light from an optical fiber under test 60. The data acquisition system 40 includes the optical receiver and the sampling circuitry, in the form of an analog-to-digital converter, for converting the electrical output from the receiver to digital output. As was previously described, the optical receiver includes photodetector 66 and a logarithmic amplifier (not shown). Data, memory addresses, and control signals are passed to and from the data acquisition system 40 and the CPU system 42 via bus 44 and control lines 45. The CPU system 42 controls the acquisition of data and the automatic masking system 46. The automatic masking system 46 has a mask RAM 48 for storing a masking pattern generated by the CPU system 42. Bus 50 pass the masking pattern data and memory addresses to the mask RAM 48 and address generator 52. The output of the mask RAM 48 is coupled via bus 54 to a shift register 56 that converts the parallel mask data input to serial output data that is coupled to an optical modulator 58, such as a Bragg cell, for blocking the return reflected light from the fiber 60. Control 62 acting as a state machine receives inputs from the data acquisition system 40, the CPU 42, clock generator 64, and the shift register 56 and generates signals that are output to the mask RAM address generator 52 for generating memory addresses and to the shift register 56 for controlling the output of the shift register 56 in timed synchronization with phase-locked clock inputs from the clock generator 64. The clock generator 64 receivers a clock input from the data acquisition system 40.

Figure 3:
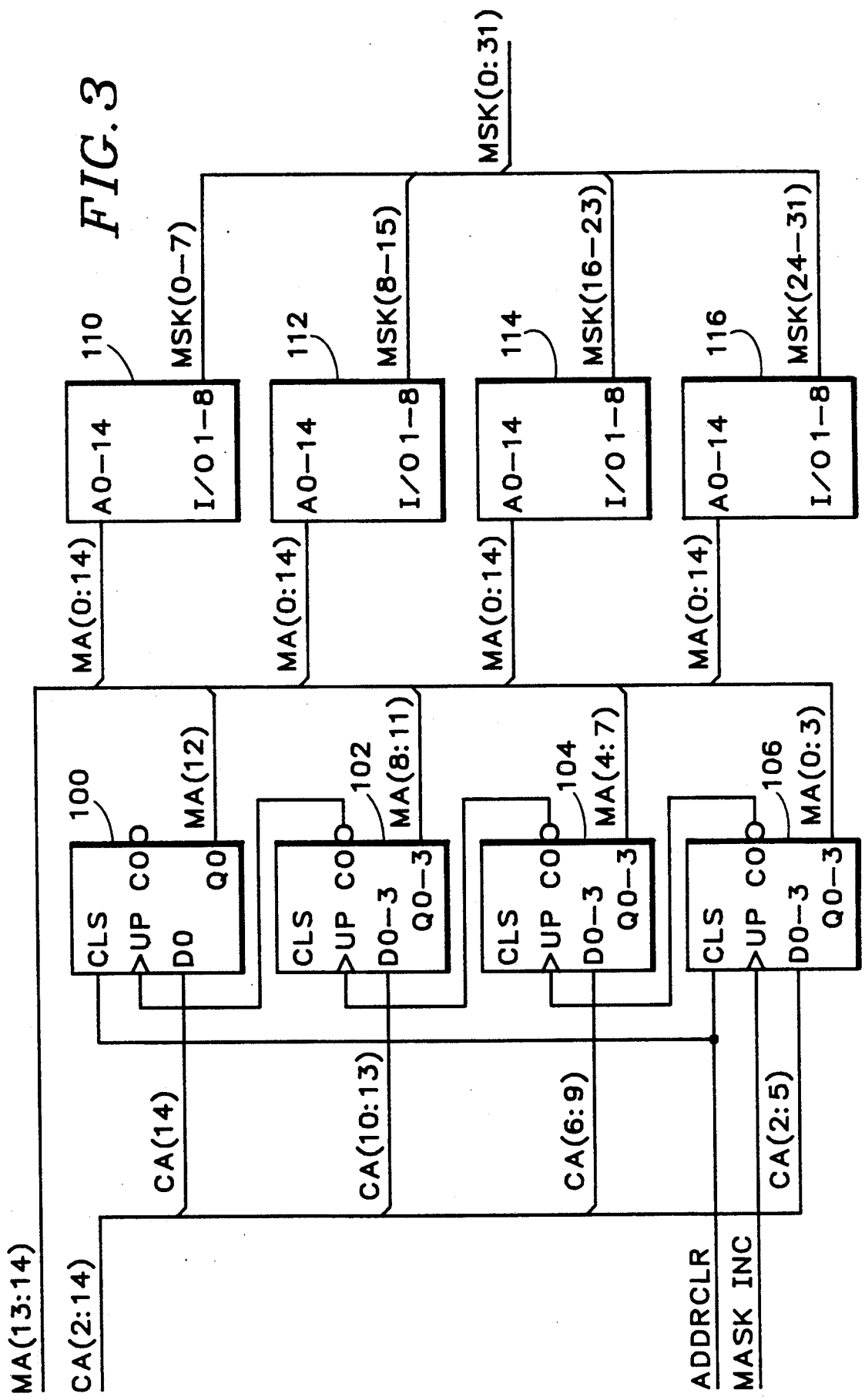
FIGS. 3, 4A and 4B are schematic diagrams of the automatic masking system of the present invention.
Figure 4A:
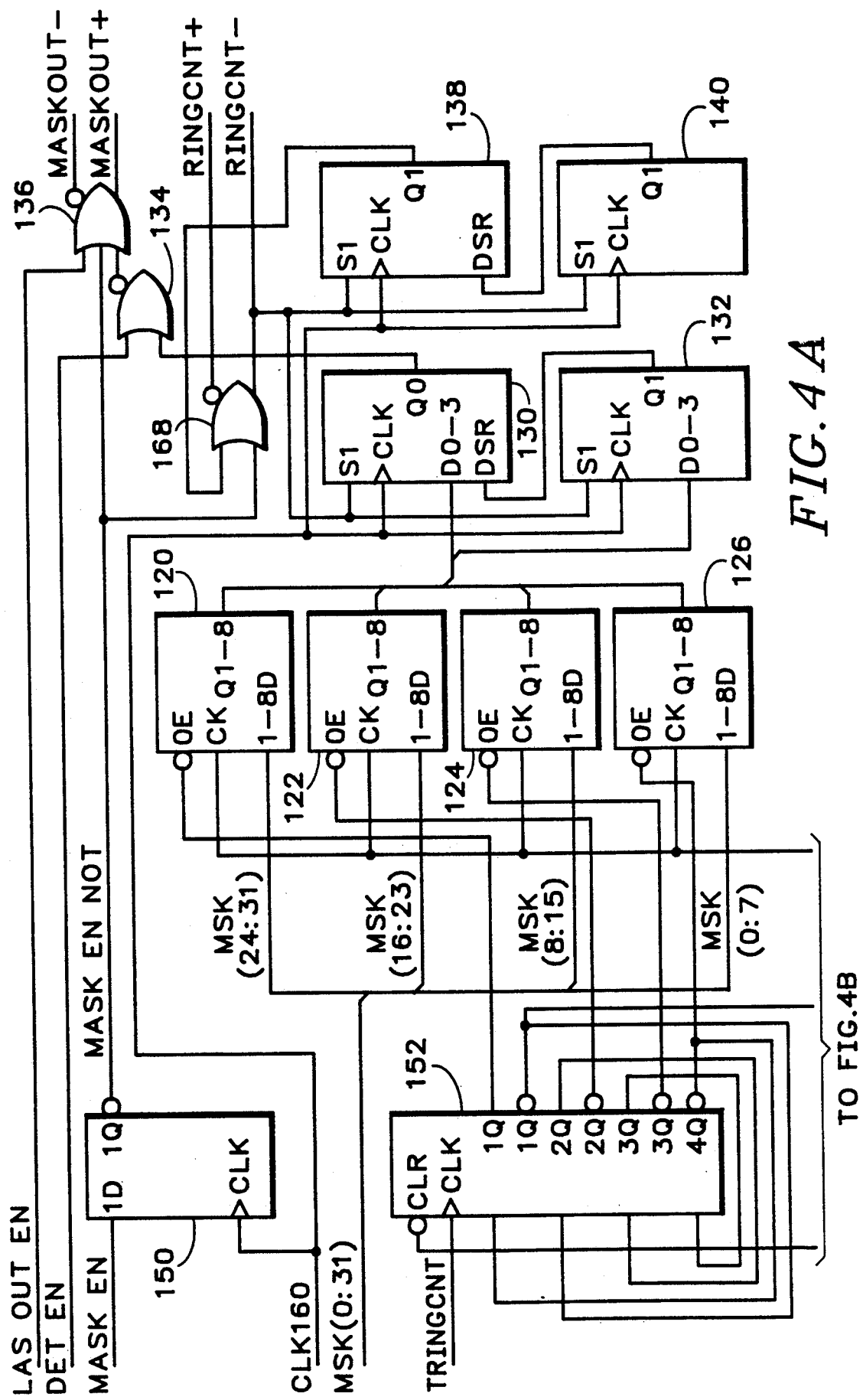
Figure 4B:
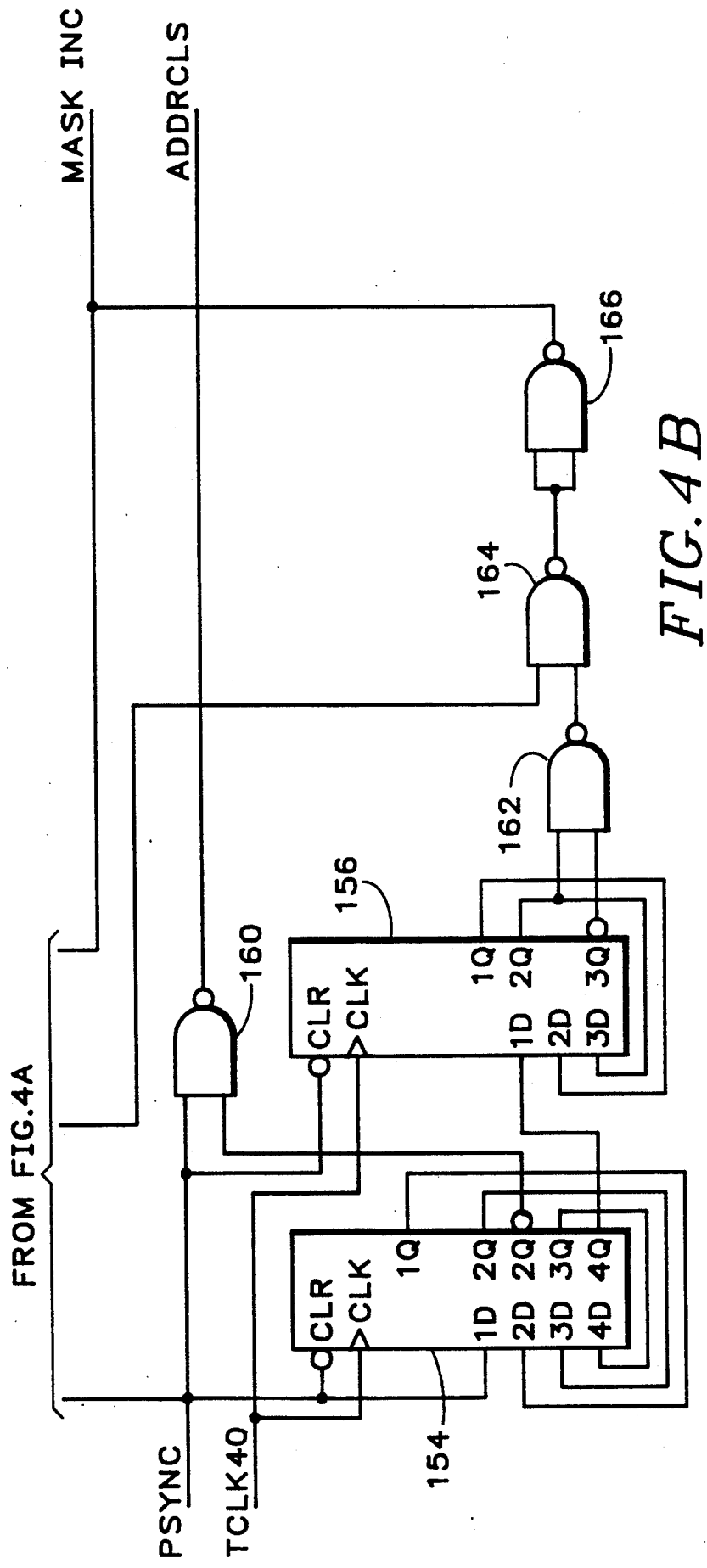

The schematic representation of the automatic masking system 46 is shown in FIGS. 3 and 4. An address counter chain made of up/down counters 100, 102, 104, and 106 receives CPU system addresses CA<1:14> at counter inputs DO-3 and outputs memory addresses MA<0:12> at QO-3. Upper memory address bits MA<13,14> are set by a status register, not shown. During masking operation, the up/down counters 100, 102, 104, and 106 provide an address that is incremented by MASK INC from the control 62, which is applied to an UP input to counter 106. The counters are cleared by the application of ADDRCLR from the control 56 to the clear input of each counter.

Memory addresses MA<0:14> are input to each of four memory RAMs 110, 112, 114, and 116. The output of the memory RAMs is a thirty-two bit data word MSK<0:31> that is applied to inputs 1D-8D of four octal flip-flops 120, 122, 124, and 126. The outputs of the octal flip-flops are loaded into shift registers 130 and 132. The serial output of the shift registers is coupled through gates 134 and 136 as MASKOUT+ and MASKOUT− to drive an RF device, not shown, that controls the on/off status of the optical modulator 58. Shift registers 138 and 140 generate a signal for loading shift registers 130 and 132 with a new byte of data from the octal flip-flops as the last bit of the previous data is transferred out to maintain an uninterrupted bit stream output.

Addresses for the mask RAMs 110, 112, 114, and 116 and control of shift registers 130, 132, 138, and are provided by quad-D flip-flops 150, 152, 154, and 156, and gates 160, 162, 164, 166, and 168 acting as control 62. Inputs to the flip-flops and the gates are PSYNC and MASK EN from the data acquisition system 40, LAS OUT EN and DET EN from the CPU system 42, clock inputs CLK160 and CLK40 from the clock generator 64, and TRINGCNT, which is a TTL logic signal equivalent of RINGCNT± from the shift register 56.

Figure 5:
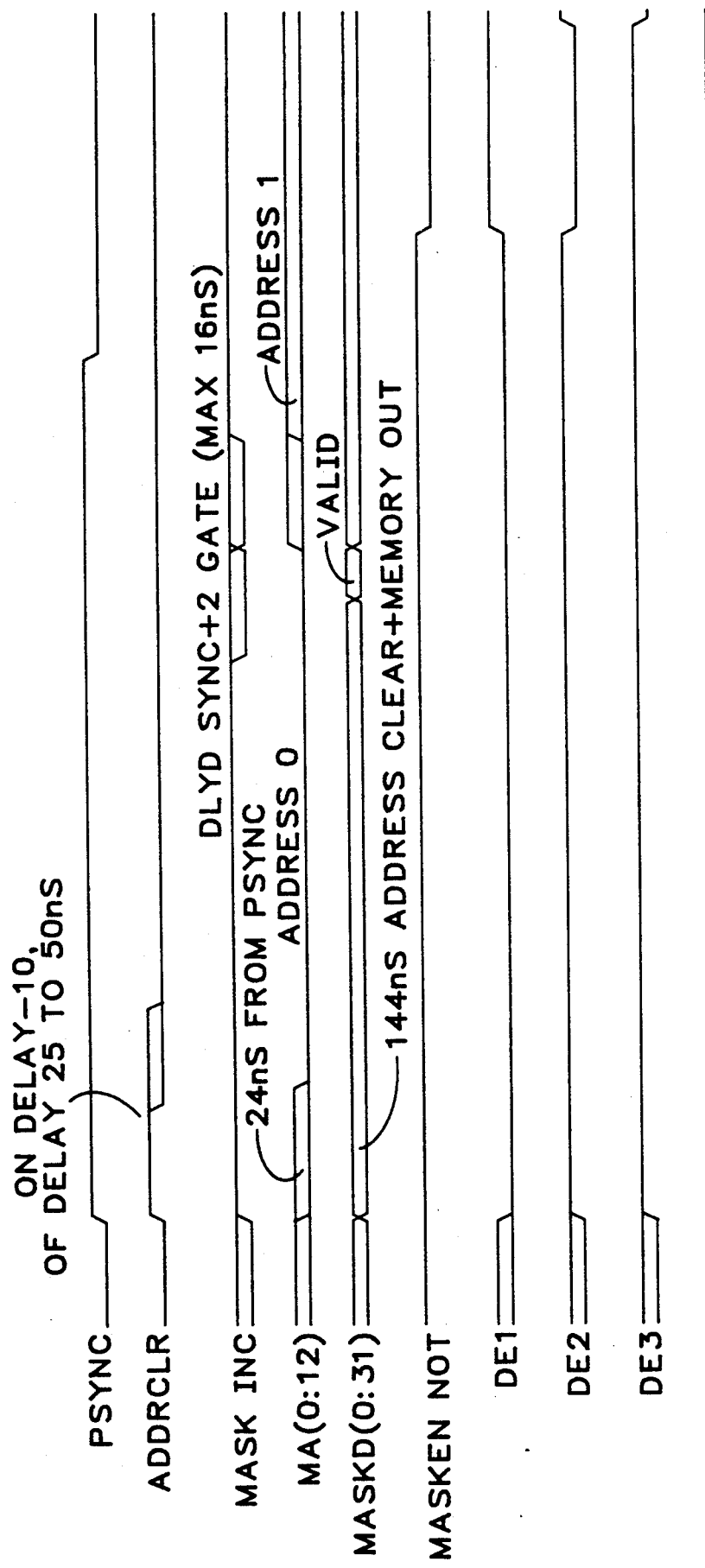
FIGS. 5 and 6 are timing diagrams for the automatic masking system of the present invention.
Figure 6:
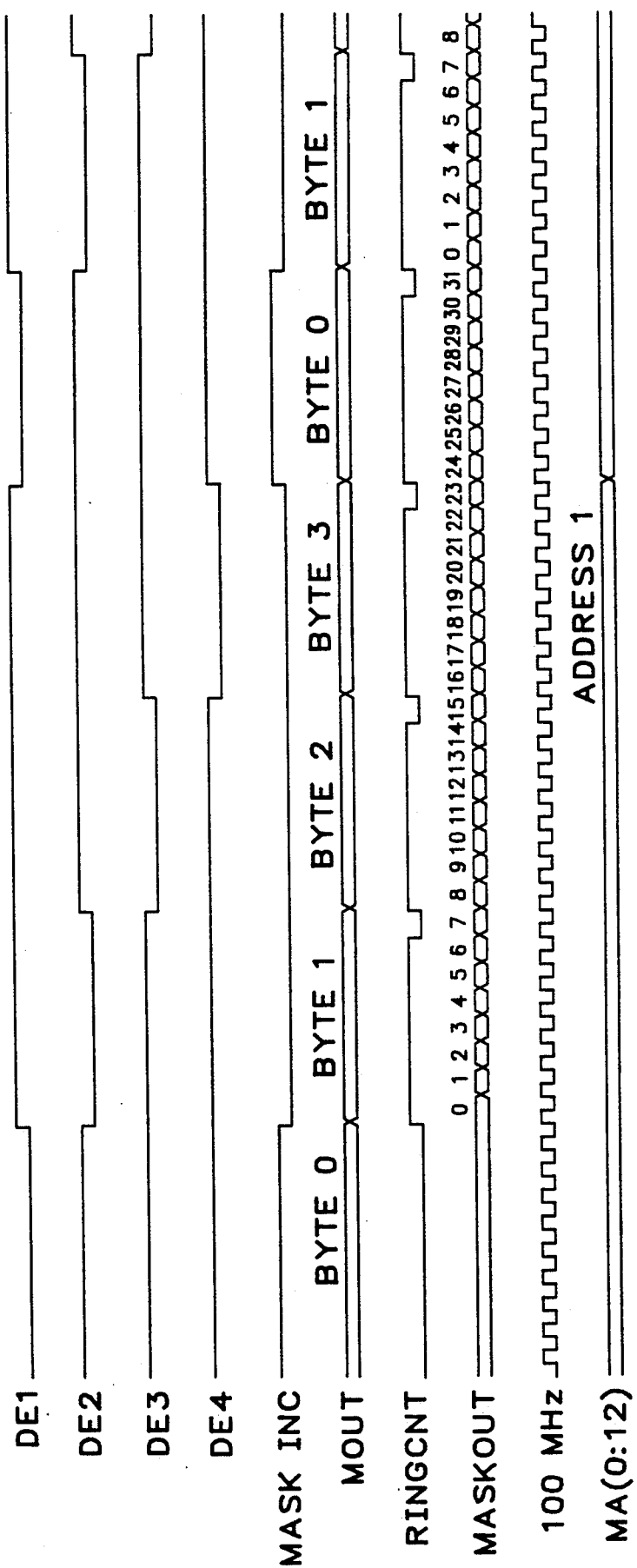
Figure 7:
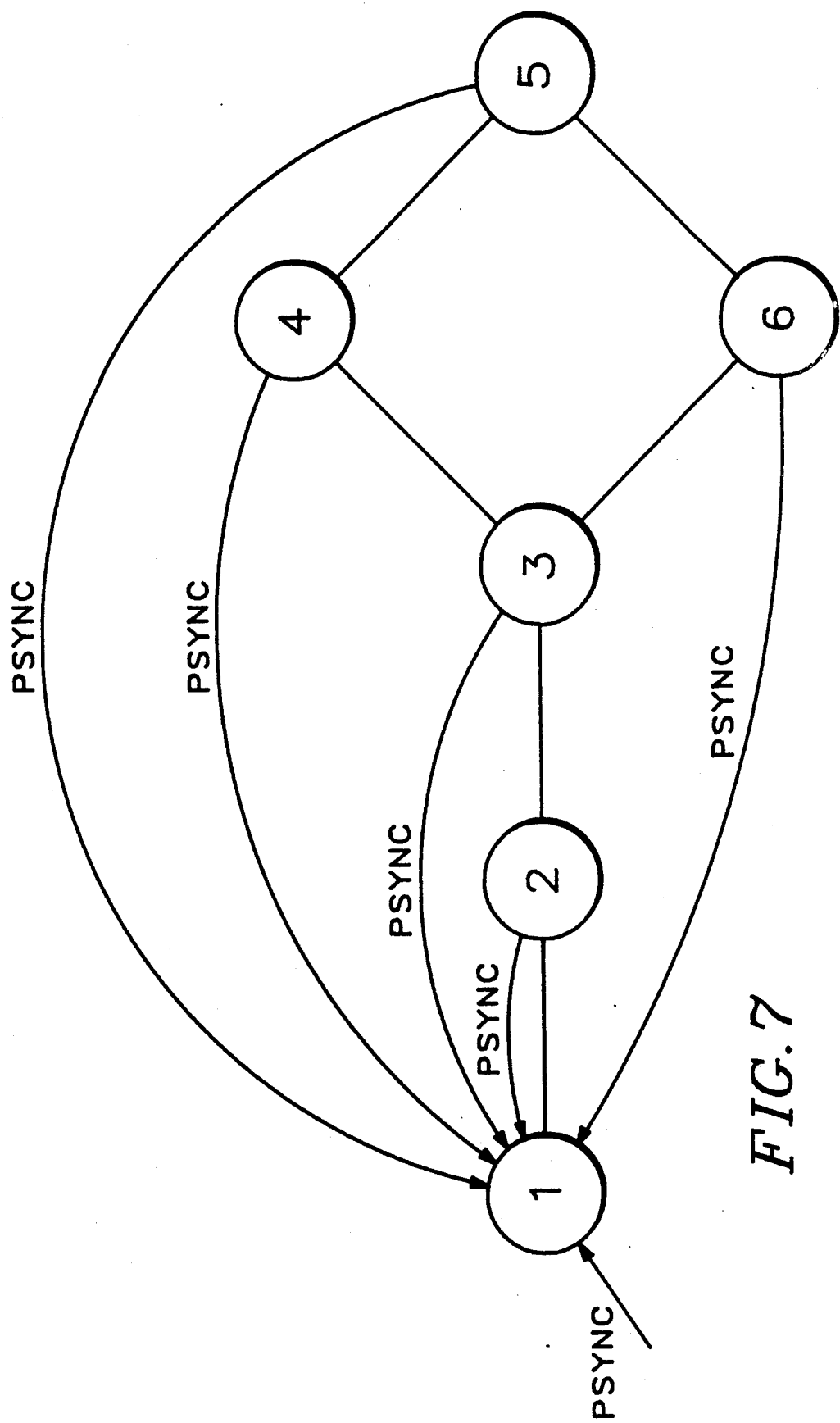
FIG. 7 is a state diagram for the automatic masking system of the present invention.

As is shown in the timing diagrams of FIGS. 5 and 6 and the state machine diagram of FIG. 7, the control 62 acts as a state machine for generating the masking output. The control 62 is set or reset to an initial state by a pulse synchronizing signal, PSYNC, from the data acquisition system 40, which clears the inputs of flip-flop 152. At PSYNC, ADDRCLR is generated by flip-flop 154 and gate 160 to reset the up/down address counters 100, 102, 104, and 106 to zero. The resetting of the counters initiates the memory access of the first thirty-two bit data word, ADDRESS 0. In a maximum 144ns from PSYNC, the data word is stable at the inputs of the four octal flip-flops 120, 122, 124, and 126 holding latches. In a minimum of 150ns from PSYNC, the control 62 advances to a second state with the generation of MASK INC from gate 166. MASK INC latches the thirty-two bit data word into flip-flops 120, 122, 124, and 126 and increments the address counter chain of flip-flops 100, 102, 104, and 106 to a second data word, ADDRESS 1. With output enable lines OE1, OE2, OE3, and OE4 in the reset state, the first eight bit byte, BYTE 0, of the data word, ADDRESS 0, is passed to the inputs of the shift registers 130 and 132. Generation of MASKEN NOT advances the control 62 to state 3. MASKEN NOT is the output from flip-flop 150 that receives MASK EN as an input. MASK EN is generated by the CPU system 42 and is synchronized to PSYNC. The clock input to the flip-flop 150 is CLK160 from the clock generator 64. MASKEN NOT is applied to one input of gate 168 that receives a second input from flip-flop 138 of the shift register 56. The output of gate 168 is RINGCNT±, which is converted to a TTL logic signal in the control 62 producing TRINGCNT and coupled to the clock input of flip-flop 152 for advancing the control 62 through states 3, 4, 5, and 6.

At PSYNC, the output enable lines OE1, OE2, OE3, and OE4 from flip-flop 152 to the memory latches 120, 122, 124, and 126 are reset to the states shown in FIG. 5 and held there until MASKEN NOT occurs. When MASKEN NOT goes active low, the control 62 advances to state 3 and the data in shift registers 130 and 132 starts shifting out serially at a 160 MHZ rate. At the same time TRINGCNT clocks flip-flop 152 causing OE1 to go positive and OE2 to go negative, which transfers BYTE 1 of the data word, ADDRESS 0, to the inputs of the registers 130 and 132 and transitions MASK INC to an active low. Shift registers 138 and 140 keep track of the bit count from registers 130 and 132 and generate an output to gate 168 to produce a RINGCNT pulse as the last bit of the data byte is transferred out. Control 62 advances to state 4 when the translated RINGCNT, TRINGCNT, clocks flip-flop 152 producing level changes in OE2 and OE3. Control 62 advances to states 5 and 6 with each occurrence of TRINGCNT. At state 6, MASK INC transitions to an active high and increments the up/down address counters 100, 102, 104, and 106 to the next address, ADDRESS 2, and loads BYTE 0 of the ADDRESS 1 data into the shift registers 130 and 132. On the next occurrence of TRINGCNT, the control 62 transitions back to state 3 and starts outputting BYTE 0 data of ADDRESS 1 from the shift resisters 130 and 132. Control 62 loops through states 3, 4, 5, and 6 until PSYNC occurs whereupon the control 62 is reset to state 1.

LAS OUT EN and DET EN are provided from the CPU system 42 to force the output of gate 136 to particular states. DET EN is coupled to one input of gate 134 with the output of flip-flop 130 coupled to the other input. With DET EN in an active low state, the output of flip-flop 130 is passed through the gate 134 to one of the inputs to gate 136. An active high state for DET EN prevents the output from flip-flop 130 from reaching gate 136. The other inputs to gate 136 are MASKEN NOT and LAS OUT EN. With DET EN, MASKEN NOT, and LAS OUT EN in active low states, the output of flip-flop 130 is passed through gates 134 and 136 to the RF circuit for activating the optical modulator 58 to provide selective masking of the return reflected light from the fiber 60. With all of the inputs to gate 136 in the active high state, the output of gate 136 is forced into the laser out state where the optical modulator 58 is switched to block the return reflected light from the fiber 60 from impinging on photodetector 66. While in this state, data samples are acquired on the masked return reflected light where the amount of attenuation by the optical modulator is a function of its extinction ratio. With DET EN in an active high state for blocking the output from flip-flop 130 and LAS OUT EN in an active low state, the output of gate 136 is forced into the detector state where the return reflected light from the fiber is allowed to reach the photodetector 66.

Figure 8:
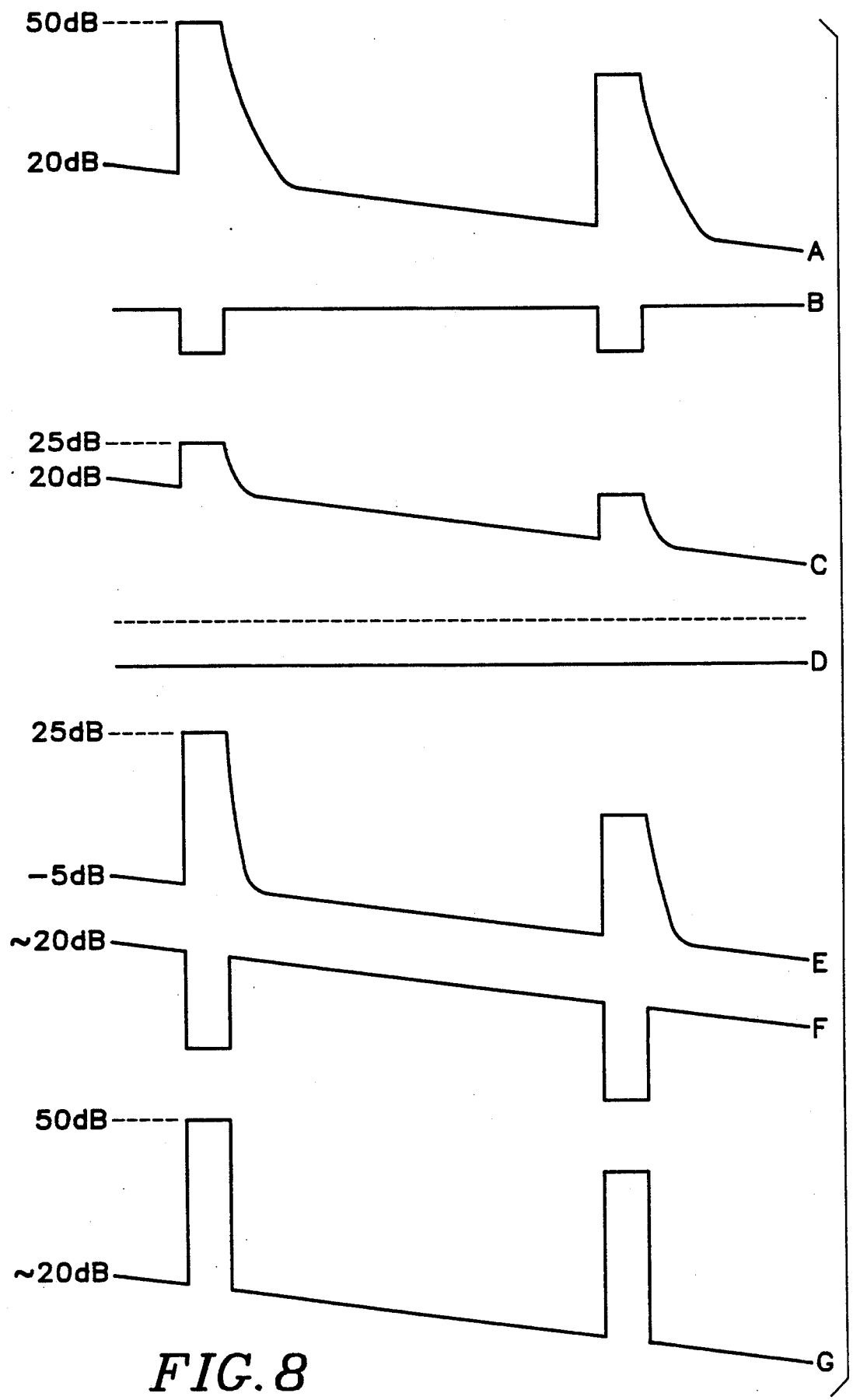
FIGS. 8A-8G are waveform diagrams for an OTDR showing the implementation of the transient response compensation method of the present invention.

FIGS. 8A-8G diagrammatically show the acquisition and reconstruction of OTDR data representative of the fiber under test 60 according to the compensation method and the automatic masking system of the present invention. Waveform 8A is a typical OTDR display of the data acquired on the return reflected light from the fiber under test 60 without the optical modulator masking the light from the fiber 60. The vertical scale of the waveform is in dB and the horizontal scale is in distance. The waveform has a generally decreasing amplitude signal level representative of the backscatter signal level on the fiber 60. High amplitude pulses are shown on the waveform representative of the high amplitude optical pulses associated with discontinuities in the fiber 60, such as cable connectors, splices, and the like. The trailing edges of these pulses slowly decay due to relaxation transients in the optical receiver. From the acquired data, a masking pattern corresponding to the high amplitude pulses is generated and stored in mask RAM 48. The fiber under test is examined again with the optical modulator 58 masking the high amplitude optical pulses in the return reflected light in response to signals from the mask generator 46, as is represented by FIG. 8B. The output of the optical receiver, as is shown in FIG. 8C, is an electrical signal level representative of the optical signal level of the return reflected light from the fiber under test 60. The electrical pulses corresponding to the high amplitude optical pulses and the receiver transients tails are attenuated due to the masking of the optical pulses. The fiber is examined a third time with the optical modulator 58 masking the return reflected light from the fiber under test 60, as is shown in FIG. 8D. The output of the optical receiver, as is shown in FIG. 8E is an attenuated electrical signal level of the return reflected light from the fiber under test 60 that is a function of the on/off ratio of the optical modulator 58. The electrical pulses and the receiver transient tails are attenuated as before. There is a large difference in the signal levels between the attenuated signal level and the unattenuated signal level, typically in the tens of dB range, due to the on/off ratio of the optical modulator 58, which is in decibels. Therefore, subtracting the attenuated signal level from the unattenuated signal level does not significantly change the unattenuated signal level. The electrical signal from the masked acquisition is combined with the electrical signal from the acquisition where the optical pulses are masked. The resultant electrical output, as shown in FIG. 8F, is representative of the signal level of the return reflected light. Low signal levels or holes exist where the high amplitude pulses exist. To reconstruct an electrical output representative of the return reflected light, the high amplitude electrical pulses from the unmasked acquisition of data are combined with the resultant output from the subtracted waveforms to produce the waveform shown in FIG. 8G.

An alternative method of compensating for relaxation transients in an optical receiver is to mask each high amplitude optical pulse in sequential order and perform the subtraction and combining of data for each pulse before preceding to the next pulse. For the acquisition of data for each subsequent optical pulse, the preceding pulses are masked. In this way, an optical pulse that may be hidden in the receiver transient tail of another pulse is not overlooked.

Figure 9:
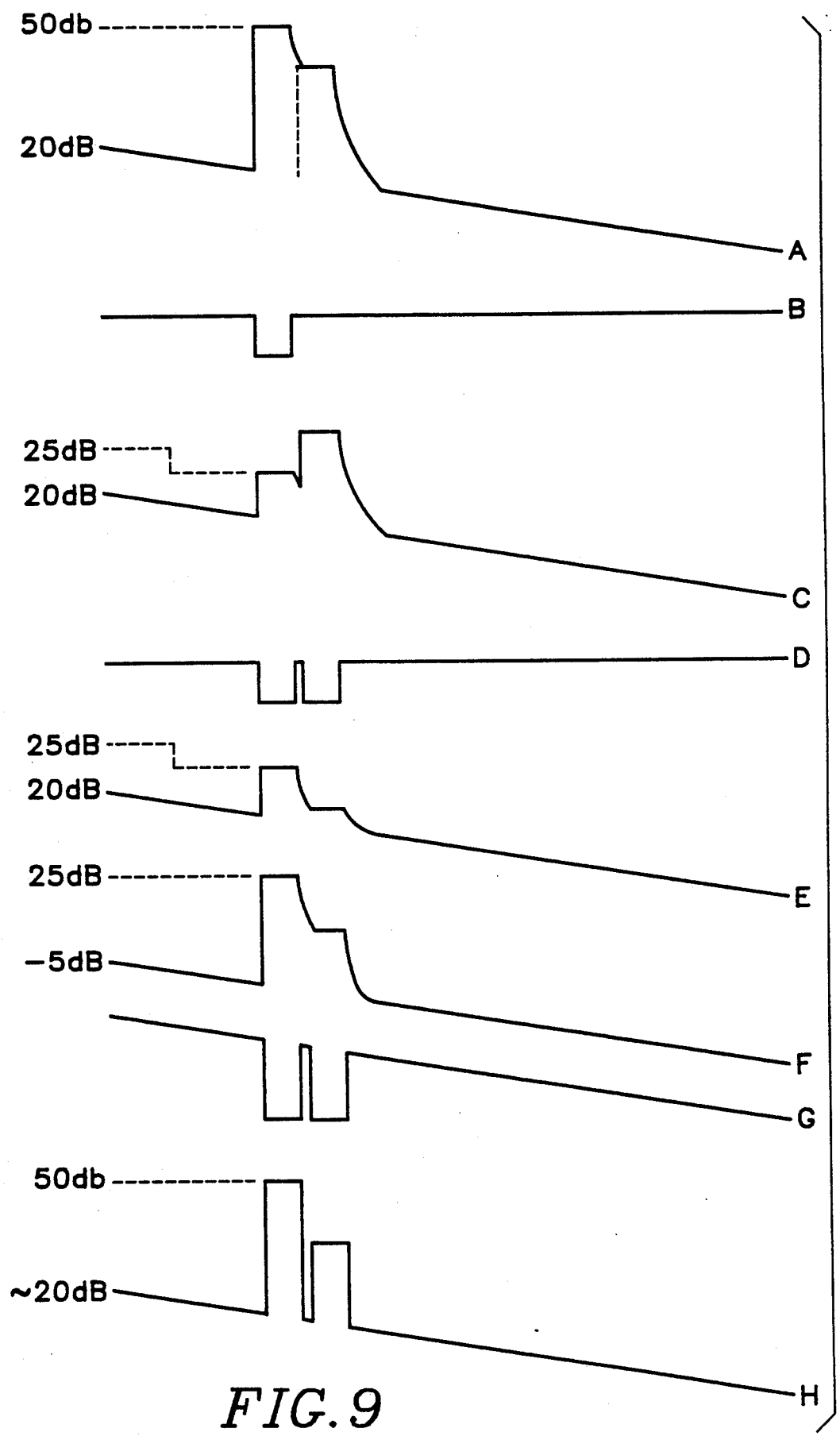
FIGS. 9A-9H are waveform diagrams in an OTDR showing the implementation of the transient response compensation method in resolving a hidden optical pulses in the OTDR data.

FIGS. 9A-9H show the case where an optical pulse is hidden by the receiver transient tail of a first refection as is shown by the partially dashed optical pulse in FIG. 9A. A mask pattern for the first optical pulse is generated from the data acquired with the return reflected light unmasked by the optical modulator 58 as was previously described. Another acquisition is made with the first optical pulse masked from the optical receiver as is shown in FIGS. 9B and 9C. A mask pattern is generated for the now exposed optical pulse and added to the original mask pattern. Another acquisition of data is made with both the first optical pulse and the partially hidden optical pulse masked from the optical receiver, as is shown in FIGS. 9D and 9E. Another acquisition of data is made with the optical modulator 58 masking the return reflected light from the optical receiver as was previously described and shown in FIG. 9F. The attenuated acquired data is subtracted from the acquired data where only the optical pulses are attenuated producing an output representative of the optical signal level of the return reflected light and having holes corresponding to the locations of the optical pulses as shown in FIG. 9G. The output corresponding to the return reflected light from the fiber under test 60 is reconstructed by combining the acquired data for the pulses with the resultant subtracted data representative of the optical signal level as shown in FIG. 9H.

A method of compensating for relaxation transients in an optical receiver has been described where large optical pulses in the input optical signal are shielded from the receiver and the sampled output is representative of the input optical signal and the attenuated relaxation transients of the receiver. A second sampled output from the optical receiver is acquired with the receiver always shielded from the optical input. The second output is representative of the attenuated optical signal level and the attenuated relaxation transients of the receiver. The second sampled output is subtracted from the first sampled output to produce an output representative of the optical input after the optical pulse. The method is implemented in an optical time domain reflectometer having an automatic masking system. The masking system provides signals for controlling an optical modulator that shields the optical receiver from the return reflected light from the fiber under test. The automatic masking system has means for generating a masking pattern from the output of the optical receiver corresponding to the high amplitude optical pulses in the return reflected light. The masking pattern is used to generate an output from the masking system for shielding the optical receiver from the high amplitude optical pulse. These and other aspects of the present invention are set forth in the appended claims.

We claim:

1. In a high dynamic range optical receiver for converting an optical signal input to an electrical signal output having a signal level representative of the optical signal input level, a method of compensating for relaxation transients in the optical receiver that produce a receiver transient tail on a trailing edge of an electrical pulse representative of a high amplitude optical pulse in the optical signal, the steps comprising:

masking the optical receiver from the high amplitude optical pulse in optical signal to produce a first electrical signal output from the optical receiver having the electrical pulse and the receiver transient tail attenuated;

masking the optical receiver from the optical signal to produce a second electrical output from the optical receiver having the signal level representative of the optical signal input level, the electrical pulse, and the receiver transient tail attenuated; and combining the second electrical output with the first electrical output to produce a resultant electrical output that is representative of the signal level of the optical signal.

2. In an optical time domain reflectometer having an optical receiver for converting a return reflected light input from a fiber under test to an electrical signal output having a signal level representative of the return reflected light, a method of compensating for relaxation transients in the optical receiver that produce a receiver transient tail on a trailing edge on an electrical pulse representative of a high amplitude optical pulse in the return reflected light, the steps comprising:

masking the optical receiver from the high amplitude optical pulse in the return reflected light to produce a first electrical signal output from the optical receiver having the electrical pulse and the receiver transient tail attenuated;

masking the optical receiver from the return reflected light to produce a second electrical output from the optical receiver having the signal level representative of the return reflected light, the electrical pulse, and the receiver transient tail attenuated; and combining the second electrical output with the first electrical output to produce a resultant electrical output that is representative of the signal level of the return reflected light.

3. The method of compensating for the relaxation transients in the optical receiver of an optical time domain reflectometer as recited in claim 2 further comprising the steps of:

applying a scaling factor to the resultant output producing a one-way optical dB output; and displaying the one-way optical dB output.

4. The method of compensating for the relaxation transients in the optical receiver in the optical time domain reflectometer as recited in claim 2 wherein the masking of the optical receiver from the return reflected light to produce a second electrical output from the optical receiver further comprises the step of applying a correction factor to the second electrical output to compensate for varying spurious responses in the first and second electrical outputs from the optical receiver.

5. In an optical time domain reflectometer having an optical receiver for converting a return reflected light input from a fiber under test to an electrical signal output having a signal level representative of the return reflected light, a method of compensating for relaxation transients in the optical receiver that produce a receiver transient tail on a trailing edge on an electrical pulse representative of a high amplitude optical pulse in the return reflected light, the steps comprising:

producing a first electrical signal output from the optical receiver having the signal level, the electrical pulse, and the receiver transient tail representative of the output of the optical receiver;

masking the optical receiver from the high amplitude optical pulse in the return reflected light to produce a second electrical signal output from the optical receiver having the electrical pulse and the receiver transient tail attenuated;

masking the optical receiver from the return reflected light to produce a third electrical output from the optical receiver having the signal level representative of the return reflected light, the electrical pulse, and the receiver transient tail attenuated;

combining the third electrical output from the second electrical output to produce a resultant electrical output that is representative of the signal level of the return reflected light; and combining the electrical pulse from the first electrical output with the resultant output to produce an electrical output representative of the return reflected light from the fiber under test.

6. The method of compensating for the relaxation transients in the optical receiver of an optical time domain reflectometer as recited in claim 5 wherein the producing step further comprises the step of generating a masking pattern from the first electrical signal output corresponding to the electrical pulse.

7. The method of compensating for the relaxation transients in the optical receiver of an optical time domain reflectometer as recited in claim 6 further comprising the steps of:

applying a scaling factor to the third output producing a one-way optical dB output; and displaying the one-way optical dB output.

8. The method of compensating for the relaxation transients in the optical receiver in the optical time domain reflectometer as recited in claim 6 wherein the masking of the optical receiver from the return reflected light to produce a third electrical output from the optical receiver further comprises the step of applying a correction factor to the third electrical output to compensate for varying spurious responses in the second and third electrical outputs from the optical receiver.

9. The method of compensating for the relaxation transients in the optical receiver in the optical time domain reflectometer as recited in claim 5 wherein the return reflected light from the fiber contains more than one high amplitude optical pulse, the steps comprising:

producing a first electrical signal output from the optical receiver representative of the output of the optical receiver and having the signal level, the electrical pulses corresponding to the high amplitude optical pulses, and the receiver transient tails associated with each electrical pulse;

masking the optical receiver from the high amplitude optical pulses in the return reflected light to produce a second electrical signal output from the optical receiver having the electrical pulses and each associated receiver transient tail attenuated;

masking the optical receiver from the return reflected light to produce a third electrical output from the optical receiver having the signal level representative of the return reflected light, the electrical pulses, and each associated receiver transient tail attenuated;

combining the third electrical output with the second electrical output to produce a resultant electrical output that is representative of the signal level of the return reflected light; and combining the electrical pulses from the first electrical output with the resultant output to produce an electrical output representative of the return reflected light from the fiber under test.

10. The method of compensating for the relaxation transients in the optical receiver of an optical time domain reflectometer as recited in claim 9 wherein the producing step further comprises the step of generating a masking pattern from the first electrical signal output corresponding to the electrical pulses.

11. The method of compensating for the relaxation transients in the optical receiver of an optical time domain reflectometer as recited in claim 9 further comprising the steps of:

applying a scaling factor to the third output producing a one-way optical dB output; and displaying the one-way optical dB output.

12. The method of compensating for the relaxation transients in the optical receiver in the optical time domain reflectometer as recited in claim 9 wherein the masking of the optical receiver from the return reflected light to produce a third electrical output from the optical receiver further comprises the step of applying a correction factor to the third electrical output to compensate for varying spurious responses in the second and third electrical outputs from the optical receiver.

13. In an optical time domain reflectometer wherein optical pulses are launched into an optical fiber and return reflected light from the fiber is converted to an electrical signal and sampled to produce data representative of the return reflected light, an automasking system for blocking an high amplitude optical pulse in the return reflected light comprising:

means for generating a masking pattern from the sampled data corresponding to the high amplitude optical pulse in the return reflected light; and means for transferring the masking pattern to an optical modulator for blocking the high amplitude optical pulse in the return reflected light.

14. The automasking system as recited in claim 13 further comprising a means for processing the sampled data to locate the high amplitude optical pulse in the data.

15. The automasking system as recited in claim 13 wherein the transferring means comprises a shift register for receiving the masking pattern in a parallel format and outputting the masking pattern in a serial format.

* * * * *